United States Patent [19]

Mattes et al.

[11] Patent Number: 4,712,648

[45] Date of Patent: Dec. 15, 1987

[54] DUAL MAGNETIC COIL DRIVER AND MONITOR SENSOR CIRCUIT

[75] Inventors: Michael F. Mattes; Mark A. Dorland, both of Durham, N.C.

[73] Assignee: SSI Technologies, Inc., Janesville, Wis.

[21] Appl. No.: 897,737

[22] Filed: Aug. 18, 1986

[51] Int. Cl.⁴ .................. H01F 21/06; G01L 7/16; F01M 1/22

[52] U.S. Cl. ............................. 184/6.4; 417/33; 417/38; 417/44; 73/744; 336/30

[58] Field of Search ............... 417/33, 38, 44; 184/6.4; 336/30; 73/744, 745; 323/299

[56] References Cited

U.S. PATENT DOCUMENTS

| | | | |
|---|---|---|---|
| 4,160,204 | 7/1979 | Holmgren et al. | 324/207 |
| 4,165,653 | 8/1979 | Morehouse | 336/30 |
| 4,175,443 | 11/1979 | Scheinder et al. | 73/722 |
| 4,242,914 | 1/1981 | Eshelman | 336/30 |
| 4,244,229 | 1/1981 | Pullen | 336/30 |
| 4,339,956 | 7/1982 | Iwasaki | 336/30 |
| 4,551,069 | 11/1985 | Gilmore | 417/38 |
| 4,669,960 | 2/1987 | Allen et al. | 417/63 |

OTHER PUBLICATIONS

Displacement Measuring System, Kaman Measuring Systems, Technical Data KD-2300 Series TD 282, 1982, Kaman Instrumentation Corporation, P.O. Box 7463, 1500 Garden of Gods Road, Colorado Springs, CO 80933-7463.
High Temperature Displacement Transducer, HTDT-2-83, Kaman Instrumentation Corporation, P.O. Box 7463, 1500 Garden of the Gods Road, Colorado Springs, Colorado 80933-7463.
KD-2810 Series Displacement Measuring System, Series TD 8210, 1982, Kaman Instrumentation Corporation, P.O. Box 7463, 1500 Garden of the Gods Road, Colorado Springs, Colorado 80933-7463.
General Application Considerations, Inductive Displacement Measuring Systems, Application Note Number 108 382, 1982, Kaman Instrumentation Corporation, P.O. Box 7463, 1500 Garden of the Gods Road, Colorado Springs, Colorado 80933-7463.

(List continued on next page.)

Primary Examiner—William L. Freeh
Attorney, Agent, or Firm—Andrus, Sceales, Starke & Sawall

[57] ABSTRACT

Sensor circuitry is disclosed for a transducer (32) having a sensor or delta coil (66) for generating a magnetic flux through a path of movement of a magnetically permeable piston member (48), such that movement of the member (48) changes the return coupled flux linkage, which flux change indicates movement of the member (48), and having a reference coil (84) spaced sufficiently from the path of movement of the member (48) such that movement of the latter has less affect on return coupled flux linkage of the reference coil (84) than the delta coil (66). The coils (66 and 84) are connected (204) in respective parallel voltage dividers, and a half-wave rectified AC signal (diode CR11) is applied thereto. A differential amplifier (210) senses the differential voltages across the coils and generates an output signal which is peak detected by an operational amplifier (212) and supplied to a further operational amplifier (214) for comparison against a reference input from the filtered, half-wave rectified AC signal for generating an error signal output which is then divided down as a reference input to a further operational amplifier (216) and is also delayed by charging an RC timing circuit (R24 and C5) until the charge reaches a given value relative to the threshold provided by the divided down output error signal at the reference input of the last mentioned operational amplifier (216), whereupon the latter's output transitions and triggers a switch (218) with a latching relay (220). Reset circuitry, safety threshold circuitry, protective circuitry, normal operating mode testing circuitry, and improper field installation indicating circuitry are also disclosed.

37 Claims, 5 Drawing Figures

OTHER PUBLICATIONS

Kaman's New Electronic Alignment System, Kaman Measuring Systems KD-2700 Series TD 382, 1982, Kaman Instrumentation Corporation, P.O. Box 7463, 1500 Garden of the Gods Road, Colorado Springs, Colorado, 80933-7463.

Displacement Measuring System, Kaman Measuring Systems, Technical Data KD-2310 & KD-2350 Series, 1982, Kaman Instrumentation Corporation, P.O. Box 7463, 1500 Garden of the Gods Road, Colorado Springs, Colorado 80933-7463.

KD-4000 Displacement Measuring Systems, Technical Data KD-4000 Systems, Kaman Instrumentation Corporation, P.O. Box 7463, Colorado Springs, Colorado 80933-7463, 1984.

KD-5100 Series Differential Measuring Systems, P.O. Box 7463, 1500 Garden of the Gods Road, Colorado Springs, Colorado 80933-7463.

Proximity Measuring System Model KD-2400, PMS382, Kaman Instrumentation Corporation, P.O. Box 7463, 1500 Garden of the Gods Road, Colorado Springs, Colorado 80933-7463.

Measurement Errors Introduced By Ferro Magnetic Target Materials, General Applications Considerations, Application Note Number 109, APP Note 109 799, 1979, Kaman Instrumentation Corporation, P.O. Box 7463, 1500 Garden of the Gods Road, Colorado Springs, CO 80933-7463.

High Temperature Pressure Measuring System, HTP-11-82, Kaman Instrumentation Corporation, P.O. Box 7463, 1500 Garden of the Gods Road, Colorado Springs, CO 80933-7463.

"Oil Pressure Safety Controls", Copeland Application Engineering Bulletin AE-1095-R9, Sep. 1, 1981.

"Successful Steps To Seal Technology", Bal Seal Engineering Company, Inc., 620 West Warner Avenue, Santa Ana, California 92707-3398.

Installation Data LG3321 Series, Lube Oil Protection, Robertshaw Controls Co. Uni-Line Division, P.O. Box 2000, 4190 Temescal Street, Corona, California 91720, Form No. 1-285, Nov., 1978.

Robertshaw LG Series Gard-Pak IV, Sold State Oil Protection Controls, Robertshaw Controls Company, Appliance Controls Marketing Group, 155 Hill Street, Milford, Conn. 06460.

Underwriters Laboratories Inc. Recognized Component Directory, Mar., 1985, Section SDFY2 Refrigeration Accessories Controllers.

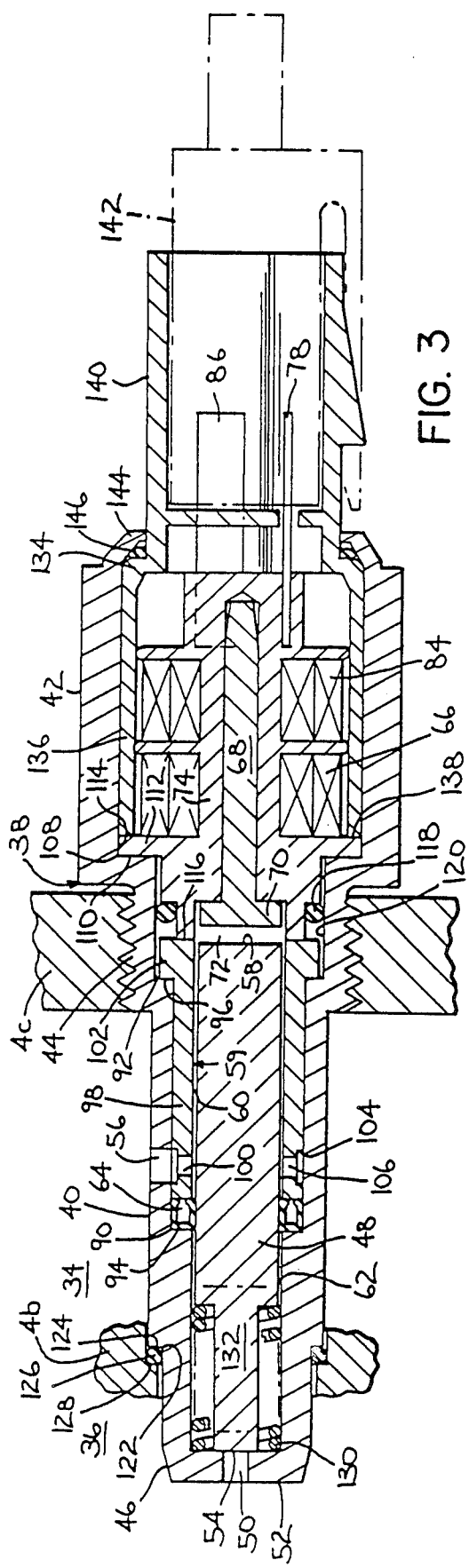
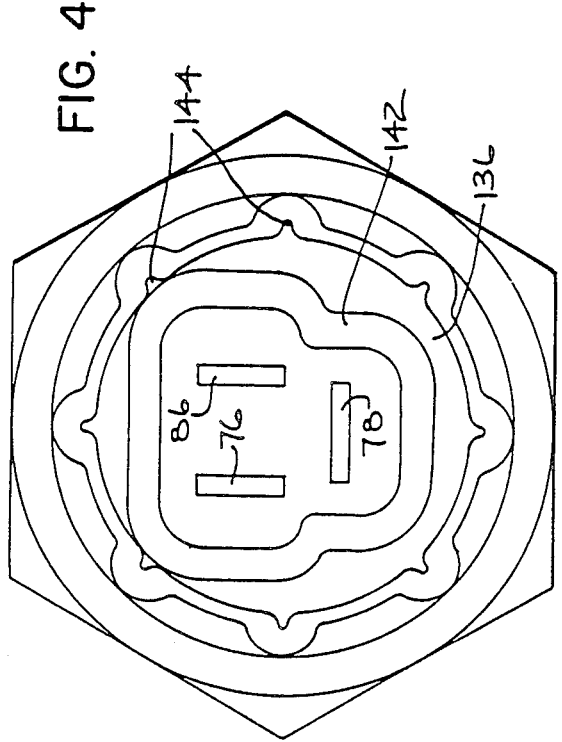
FIG. 3
FIG. 4 though the invention is not limited thereto.

DUAL MAGNETIC COIL DRIVER AND MONITOR SENSOR CIRCUIT

BACKGROUND AND SUMMARY

The invention provides sensor circuitry for a transducer having dual magnetic coils. The invention is particularly useful in connection with the oil pressure sensor shown in co-pending application Ser. No. 830,769, filed Feb. 19, 1986, incorporated herein by reference, though the invention is not limited thereto.

A transducer has a sensor or delta coil for generating a magnetic flux path through a path of movement of a magnetically permeable member, such as a piston which moves in response to pressure fluctuation as in the above noted co-pending application. Movement of the member changes the returned coupled flux linkage, which flux change indicates movement of the member. A reference coil is spaced sufficiently from the path of movement of the member, for example on the opposite side of the delta coil from the piston as in the above noted co-pending application, such that movement of the member has less affect on return coupled flux linkage of the reference coil than the delta coil. The reference coil compensates for environmental and ambient parameters such as temperature since such parameters affect both coils equally.

The present invention provides simple and reliable sensing circuitry for the coils. The circuit provides accurate sensing of differential voltages across the coils and provides an output error signal, which in conjunction with the above application indicates a low differential pressure or failure condition of the pump and turns off the pump motor. In the preferred embodiment, a half-wave rectified AC signal is applied to both coils in parallel and there is no relative phase shift between the coils. A differential amplifier compares the voltages across the coils and generates an amplified difference output which is compared against a dynamic floating reference provided by the half-wave rectified AC signal and which in turn provides an output error signal which charges an RC timing circuit for comparison against such error signal in a further differential amplifier whose output triggers a latching relay to turn off the pump motor.

The circuit includes various protective features preventing false tripping of the relay and preventing false resetting of the relay. The circuitry includes a safety threshold circuit supplying regulated DC as a reference regardless of the condition of the output error signal, to further prevent false tripping. The circuitry includes a subcircuit for indicating improper field installation including non-connection of the sensor circuitry to the coils or defective cable connections or the like, by ensuring that the voltage across the reference coil will be less than the voltage across the delta coil. The circuitry includes a test contact subcircuit to prevent differential voltages from being developed across the coils and prevent an output error signal, whereby to simulate a non-error condition of the pump.

BRIEF DESCRIPTION OF THE DRAWINGS

FIGS. 1-4 are taken from the above noted copending application Ser. No. 830,769, filed Feb. 19, 1986.

FIG. 1 shows a refrigeration compressor, as known in the art.

FIG. 2 is an elevation side view of a low oil pressure sensor in accordance with the above noted application which may be directly mounted to the pump body on the compressor of FIG. 1.

FIG. 3 is a cross-sectional view of the sensor of FIG. 2.

FIG. 4 is an end elevation view of the sensor of FIG. 2.

DETAILED DESCRIPTION

Figure 1:
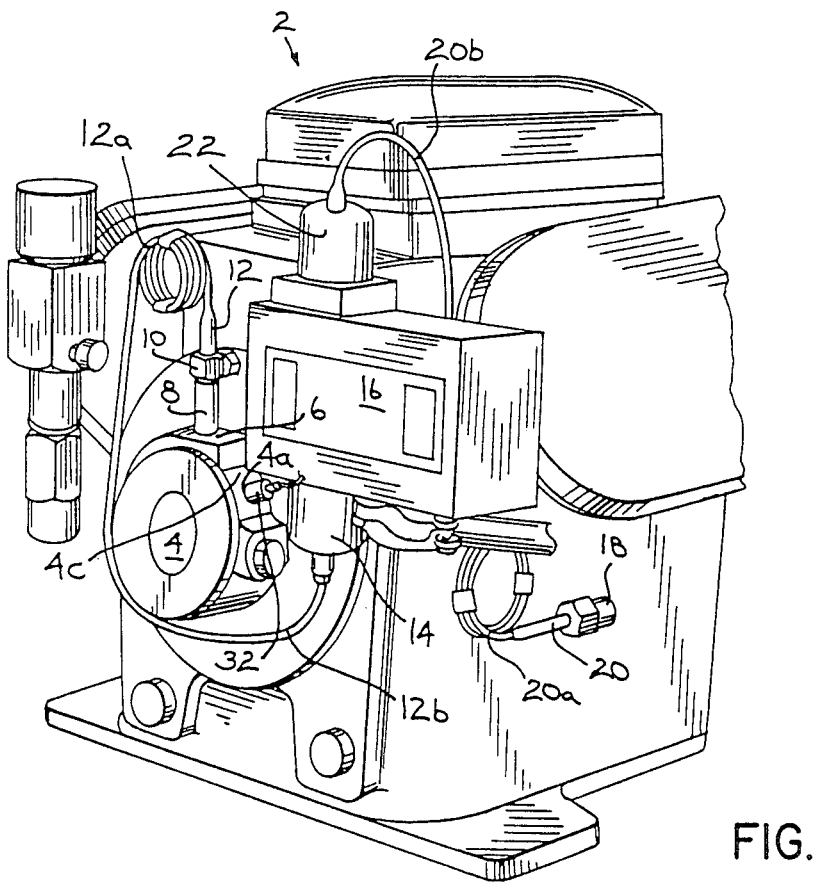

FIG. 1 shows a refrigeration compressor 2 known in the prior art, for example as shown in Copeland Application Engineering Bulletin AE-1095-R9, Sept. 1, 1981. Oil pump 4 has a high pressure port 6 with a tee fitting 8 with a Schrader valve 10 in the branch connection and high pressure copper tubing 12 in the run connection. Copper tubing 12 is coiled at 12a and then extends downwardly and around at 12b to high pressure bellows 14 to communicate the high pressure side of pump 4 to oil pressure safety control 16, such as Penn Model No. P45NCA-12, Ranco O Model No. P30-5826 or Robertshaw model Model No. PD21-2502. The low pressure side of pump 4 is sensed through the crankcase at crankcase port connection 18 connected to copper tubing 20 which is coiled at 20a and then extends upwardly and around at 20b and is connected to the low pressure bellows 22 connected to control unit 16. When a given differential pressure is sensed between the high and low sides of the pump, indicating a low oil pressure condition, control 16 turns off compressor 2 to protect the latter.

Figure 2:
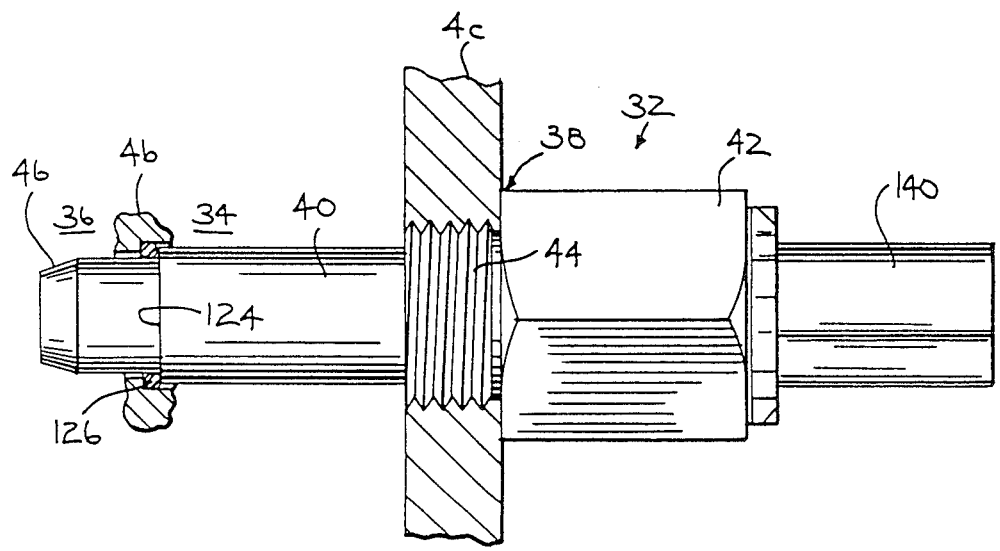

The above noted co-pending application provides a low oil pressure sensor 32, FIGS. 2-4, for direct mounting to lubrication pump 4, for example at 4a, and directly inserted into and across the high and low pressure sides 34 and 36 of the pump divided by dividing pump section 4b, to sense differential pump pressure. Sensor body 38 has a first portion 40 disposed internally within pump 4 to be exposed to the internal pump environment, and a second portion 42 extending externally of the pump. Sensor body 38 includes a threaded section 44 between the first internal portion 40 and the second external portion 42 for direct threaded connection to the outer wall 4c of the pump which has a threaded aperture formed therethrough. Outer portion 42 has an exterior perimeter in a hex shape. Internal portion 40 has an external cylindrical shape and a tapered left end leading nose 46.

A magnetically permeable piston 48 is axially slideable left-right within first internal sensor body portion 40. A low pressure port 50 is provided by an aperture formed axially through the left end wall 52 of internal body portion 40 and communicates with the low pressure side 36 of the pump to apply low pressure from the latter to the left axial end 54 of the piston. A high pressure port 56 is provided by an aperture formed radially through the sidewall of body portion 40 and communicating with the high pressure side 34 of the pump to apply pressure from the latter to the right axial end 58 of the piston. Damping means 60 is provided between high pressure port 56 and right axial end 58 of the piston for damping high pressure pulses and transients from the high oressure side 34 of the pump, to prevent false triggering. Piston 48 is a cylindrical member, and the interior sidewall 62 of body portion 40 is also cylindrical and leaves a radial gap 60 to the piston. Damping is provided by the long narrow axial passage formed by radial gap 60, which passage extends from high pressure port radial aperture 56 axially rightwardly through radial gap 60 between piston 48 and interior sidewall 62 to right end 58 of the piston to apply high pressure thereto. Sealing means such as a spring biased seal 64, for example a low friction low pressure reciprocating seal as provided by Bal Seal Engineering Company, Inc., 620 West Warner Avenue, Santa Ana, Calif., is provided to the left of radial aperture 56 and radially between piston 48 and interior sidewall 62 to seal and isolate the low pressure on the left of ring 64 from the high pressure on the right of ring 64.

A magnetic coil 66 is mounted in body 32 for generating a flux path including portions extending into the path of movement of piston 48, such that piston movement changes the return coupled flux linkage, which flux change indicates piston movement acording to the above noted pressure differential. In preferred form, a stationary magnetically permeable core 68 extends axially within coil 66 and has a left end with a radially enlarged head 70 axially facing the right end 58 of piston 48 across a flux gap 72. In another embodiment, the left end 70 of core 68 is not radially enlarged. A non-magnetic bobbin 74 is mounted in sensor body portion 42, and coil 66 is wound around such bobbin. Core 68 is staked or otherwise fixedly mounted within bobbin 74. The coil wire ends are connected to respective terminals 76 and 78 which are staked in the right end of bobbin 74 and extend axially rightwardly therefrom.

An electrical potential is applied across the coils, to be described in greater detail hereinafter in conjunction with FIG. 5. Current through coil 66 induces magnetic flux in core 68. The magnetic flux circuit path flows through core 68, across flux gap 72, through piston 48, and back through the sensor body to the right end of core 68. Closing the flux gap 72 by rightward movement of piston 48 increases the flux density and hence the inductance of coil 66, and thus increases the impedance of the coil and the voltage thereacross. A second coil 84 is wound on bobbin 74 to the right of coil 66. Coil 66 is a sensor or delta coil and coil 84 is a reference coil. The coil wire ends of coil 84 are connected to terminals 86 and 78. In another embodiment, terminals 76, 78 and 86 are round in end view, rather than rectangular, FIG. 4. Current through coil 84 also induces a magnetic flux in core 68. The same above described magnetic circuit is established through the core, and the closing of gap 72 increases the flux density and thereby increases the inductance of coil 84. The physical location of coil 84 to the right of coil 66 causes a smaller inductance increase in coil 84 than in coil 66 due to the same movement of piston 48 for the same currents through the coils. The position of piston 48 is sensed by monitoring the change in the inductance of coil 66 relative to the inductance of coil 84. Environmental parameters such as temperature are negated since they will affect both coils 66 and 84 equally.

The interior sidewall 62 of sensor body portion 40 has step reductions 90 and 92 in internal diameter forming respective first and second shoulders 94 and 96. Seal 64 is axially stopped leftwardly against shoulder 94. Sensor body portion 40 includes a non-magnetic bushing 98 extending rightwardly from seal 64 and of a radial width substantially equal to the radial height of shoulder 94. Bushing 98 has an aperture 100 therethrough aligned with radial aperture 56 to provide the noted high pressure port. The interior of bushing 98 is spaced from piston 48 by the noted radial gap 60 providing the long narrow axial damping passage. The right end of bushing 98 has a radially enlarged head 102 axially stopped leftwardly against shoulder 96. Bushing 98 has an outer circumferential recessed annulus 104 radially aligned with aperture 56 to communicate with the high pressure side 34 of the pump. Bushing 98 has a plurality of apertures such as 100 and 106 extending radially inwardly from annulus 104 to gap 60.

The interior sidewall of the second body portion 42 has a third step reduction 108 in internal diameter forming a third shoulder 110. Bobbin 74 has a first left end portion 112 axially stopped leftwardly against shoulder 110 and of a diameter substantially equal to the larger diameter 114 of shoulder 110. Bobbin 74 has a further leftwardly extending second left end portion 116 axially stopped leftwardly against the enlarged head right end 102 of bushing 98. An O-ring seal 118 is provided between the left end 116 of the bobbin and the interior sidewall of the sensor body at 120.

The exterior sidewall of sensor body portion 40 has a step reduction 122 in outer diameter forming a shoulder 124. An O-ring seal 126 is axially stopped rightwardly against shoulder 124 upon leftward axial insertion of the sensor body and may mate with a like step shoulder 128 in dividing section 4b to be axially and radially compressed thereagainst to separate and isolate the high and low pressure sides of the pump. In another embodiment, step 122 and shoulder 124 are replaced by an annular groove receiving O-ring 126 therein, where dividing section 4b does not have step shoulder 128.

Piston 48 is biased rightwardly by compression spring 130 within sensor body portion 40 spring 130 bears at its left end against left end wall 52 of the body and encircles low pressure port aperture 50, and bears at its right end against piston 48 to bias the latter rightwardly. The piston may include a leftward reduced diameter extension 132 extending axially leftwardly within spring 130 and which may engage left end wall 52 to provide a left end stop for piston movement.

A non-magnetic and electrically insulative shroud 134 includes a left cylindrical portion 136 within sensor body portion 42 and encircling coils 66 and 84 and bobbin 74. Shroud 134 has a left end 138 axially stopped against the largest diameter left end section 112 of the bobbin. Shroud 134 has a right portion 140 around terminals 76, 78 and 86 and extending axially rightwardly therebeyond. Right external shroud portion 140 has a configured perimeter shape as shown in FIG. 4 to provide a keyed orientation fit of an external connector such as 142, shown in dashed line in FIG. 3. The right end of sensor body portion 42 has a slight flange extension which is crimped radially inwardly at a plurality of points along its circumference, as shown at 144, to hold shroud 134 and the remaining internal components in assembled condition. A gasket 146 may be provided around the shroud before the crimping, to afford further sealing.

Figure 5:
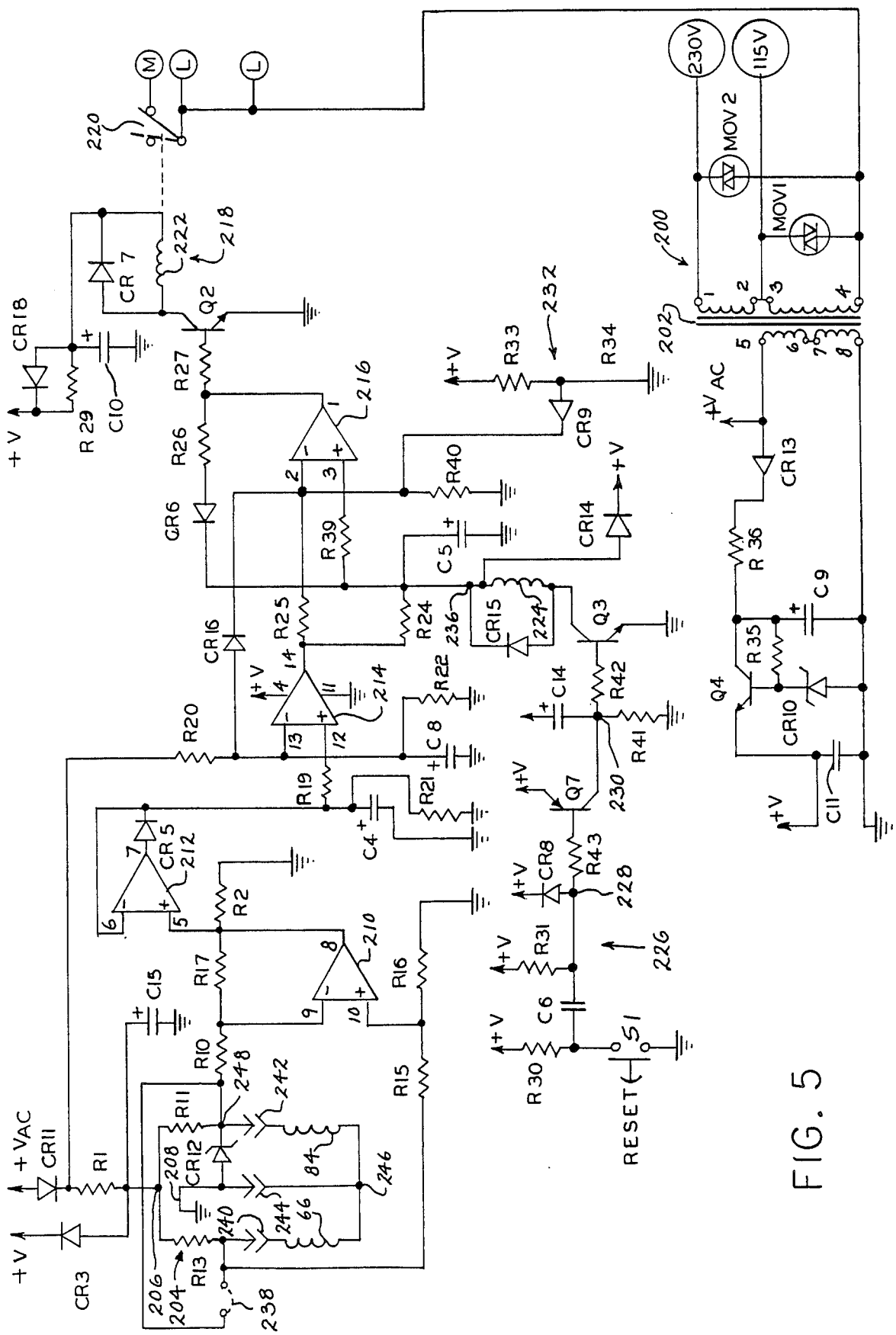
FIG. 5 is a circuit diagram of driver and monitor sensor circuitry in accordance with the present invention.

FIG. 5 shows driver and monitor sensor circuitry in accordance with the invention for transducer 32 having sensor or delta coil 66 for generating a magnetic flux path through a path of movement of magnetically permeable piston member 48. Movement of member 48 changes the return coupled flux linkage, which flux linkage indicates movement of member 48. Reference coil 84 is spaced sufficiently from the path of movement of member 48 such that movement of the latter has less affect on return coupled flux linkage of reference coil 84 than delta coil 66.

The circuitry in FIG. 5 includes a power supply 200 supplying a regulated DC signal +V and supplying an AC signal +$V_{AC}$. Power supply 200 is connected to an incoming power line having a common or return line L, and 115 volt and 230 volt lines relative thereto. MOV 1 and MOV 2 are connected across respective 115 volt and 230 volt lines to provide transient surge protection. Isolation transformer 202 steps down the line voltage to provide the noted AC signal at +$V_{AC}$. The AC signal is rectified through diode CR13 and filtered with resistor R36 and capacitor C9, which half-wave rectified filter signal is then smoothed out or DC regulated by resistor R35, zener diode CR10 and bipolar NPN transistor Q4 forming a standard regulator circuit. Capacitor C11 provides high frequency filtering.

The AC signal is half-wave rectified by diode CR11 and supplied through resistor R1 to a circuit 204 connecting coils 66 and 84 in parallel voltage dividers through respective resistors R13 and R11 between node 206 and node 246 connected to a common reference potential or ground 208, to apply electrical potential across the coils. The coils are driven uniformly from the same source at node 206 such that the same voltage is applied to resistors R13 and R11, and there is no phase shift in the coils relative to each other.

The coil voltages are sensed by a differential amplifier 210, which in the disclosed embodiment is one-fourth of a quad differential amplifier chip, such as a National Semiconductor LM2902, wherein manufacturer assigned pin number designations are used to facilitate clarity. The voltage across reference coil 84 is provided through the voltage divider network provided by resistor R11 and coil 84 and is sensed at the minus input terminal, pin 9, as a reference input of differential amplifier 210. The voltage across delta coil 66 is supplied through the voltage divider network provided by resistor R13 and coil 66 and is sensed at the plus input terminal, pin 10, as the comparing input of differential amplifier 210. When magnetically permeable piston member 48 moves axially rightwardly to reduce magnetic air gap 72, the voltage across coil 66 and hence the voltage at comparing input pin 10 increases relative to the voltage across reference coil 84 and the voltage at reference input pin 9, such that the output at pin 8 is the amplified difference between input pin 10 and input pin 9. The output of differential amplifier 210 is half-wave rectified through operational amplifier 212, which may be another fourth of the noted chip, filtered by capacitor C4 and supplied to pin 12 of operational amplifier 214 which may be another fourth of the noted chip for comparison to a threshold supplied to pin 13 of amplifier 214. Amplifier 212 and capacitor C4 act as a peak detector. Amplifier 214 generates an output error signal at pin 14.

The output of differential amplifier 210 is connected to the plus input pin 5 as a half-wave difference input of operational amplifier 212. The output of amplifier 212 at pin 7 is supplied through diode CR5 and fed back to the minus input pin 6 as a reference input. The output of amplifier 212 through diode CR5 is stored by capacitor C4 and discharged by resistor R21 and supplied through resistor R19 to the plus input pin 12 as a comparing input of amplifier 214. The half-wave rectified AC signal through diode CR11 is provided through the voltage divider network provided by resistor R20 and resistor R22 and filtered by capacitor C8 and provided to the minus input pin 13 as a reference input of amplifier 214 and provides a dynamic floating threshold reference which varies with the AC signal. When the voltage at output pin 8 of differential amplifier 210 increases, the voltage at comparing input pin 12 of differential amplifier 214 increases. Amplifier 212 and diode CR5 provide a peak detector in conjunction with capacitor C4 and resistor R21. When the voltage at input pin 10 rises above a given value relative to the voltage at pin 9, the voltage at pin 12 rises above a given threshold value relative to the filtered half-wave rectified AC signal voltage at reference input pin 13, and the output pin 14 of differential amplifier 214 transitions high and provides an output error signal.

The output error signal from output pin 14 of differential amplifier 214 is supplied through a voltage divider network provided by resistors R25 and R40 and supplied to the minus input pin 2 as a reference input of operational amplifier 216, which may be another fourth of the noted chip. The output from amplifier 214 at pin 14 is also supplied through an RC timing circuit provided by resistor R24 and capacitor C5 and through resistor R39 to the plus input pin 3 as a comparing input of amplifier 216. The RC timing circuit effectively delays the error output signal and does so relative to a dynamic timing reference which changes with the system, thus providing a fixed relative delay, and avoiding the problems inherent in a fixed absolute delay. The output of amplifier 216 at pin 1 transitions high when the voltage at comparing input pin 3 increases as the output error signal from output pin 14 of amplifier 214 charges capacitor C5 above a given threshold value relative to the voltage at reference input pin 2 of amplifier 216 provided by dividing down the output error signal from pin 14 of amplifier 214. The timing threshold compensates and changes with tolerances and temperature since its supply is the same as the supply for the RC timing circuit. Output pin 1 of differential amplifier 216 is connected through resistor R26 and diode CR6 through resistor R39 to the comparing input pin 3 of differential amplifier 216 to rapidly drive output pin 1 out of the linear region and prevent oscillation of such output.

A switching circuit 218 is connected to the output of differential amplifier 216 and is actuated by the delayed output error signal to provide a designated switching function, e.g., turning off the pump motor M in the above application. The regulated DC signal voltage +V charges capacitor C10 through resistor R29. A latching relay 220 has a set coil 222 conected to capacitor C10. A semiconductor switch Q2 has a pair of main terminals connected in series with the set coil as provided by bipolar NPN transistor Q2 having its collector and emitter connected in series with set coil 222. Switch Q2 has a base or control terminal connected through resistor R27 to the output of differential amplifier 216 such that transitioning of the latter high biases the base of transistor Q2 and drives the latter into conduction to complete a current path therethrough and discharge capacitor C10 through set coil 222 to actuate relay contacts 220 to a leftward condition shown in dashed line disconnecting motor M from the power line L. Diode CR7 provides reverse shunting to prevent high voltage transients upon turn OFF of Q2. Diode CR18 provides a low impedance path back to the power source from capacitor C10 during power down or power outage, to prevent capacitor C10 from discharging through set coil 222 if transistor Q2 is triggered on during such power glitch, etc., to thus prevent energization of coil 222 and setting of relay 220.

Relay 220 has a reset coil 224 connected to capacitor C5. A semiconductor switch Q3 has its main terminals connected in series with the reset coil, as provided by bipolar NPN transistor Q3 having its collector and emitter connected in series with reset coil 224. Transistor Q3 has a base or control terminal controlled by a user operated manual reset switch S1 connected in a reset circuit 226 with the regulated DC signal +V for biasing the gate of Q3 and driving Q3 into conduction to complete a current path therethrough and discharge capacitor C5 through reset coil 224 to resettingly actuate relay 220 to rightward position as shown in solid line, to reconnect motor M to the line L.

In the preferred embodiment, the reset circuit resets only once when reset switch S1 is depressed by the user even if the reset button of switch S1 is held down. When the user depresses the reset button to close reset switch S1, a temporary negative spike appears at node 228 between resistor R43, diode CR 8 and resistor R31, which negative spike turns ON PNP transistor Q7 briefly to allow current to flow from the regulated DC signal source through transistor Q7 to charge up capacitor C14. The positive charge at node 230 between resistors R41 and R42 and capacitor C14 drives transistor Q3 into conduction, whereby capacitor C5 discharges through reset coil 224. Diode CR15 provides reverse shunting to prevent high voltage transients upon turn OFF of transistor Q3.

A safety threshold circuit 232 is provided for reference input pin 2 of amplifier 216. Safety threshold circuit 232 supplies the regulated DC signal +V to the reference input pin 2 of amplifier 216 to provide a minimum threshold for comparing input pin 3 of amplifier 216 regardless of the condition of the output error signal from the output pin 14 of amplifier 214, to prevent false actuation of switch 218 and latching relay 220. This provides a safety threshold for reference input pin 2 when pin 14 goes low, which could otherwise trip relay 220. Safety threshold circuit 232 includes a voltage divider network provided by resistors R33 and R34, and diode CR9 having an anode connected to a node between the series connected resistors and having a cathode connected to the reference input pin 2 of amplifier 216.

Capacitor C15 is connected through resistor R1 to the cathode of diode CR11 for filtering out discontinuities in the half-wave rectified signal through diode CR11. Diode CR3 has its anode connected to the node 206 between capacitor C15 and diode CR11 through resistor R1, and diode CR3 has a cathode supplied with the regulated DC signal +V. Diode CR3 provides transient protection by shunting current back to the power supply and thus protects amplifier 210.

Diode CR14 has its anode connected to node 236 between capacitor C5 and reset coil 224, and has its cathode supplied with the regulated EC signal +V from the power supply. Diode CR14 shunts C5 charge back to the power supply and prevents false resetting of latching relay 220 during power-down of the circuit.

Field service test contacts 238 are provided for completing a shorting circuit between the coils and ensuring that the same voltage is applied across each coil, whereby to prevent differential voltages from being developed across the coils and thus prevent the output error signal. This simulates a non-error condition of the pump, i.e., piston member 48 is in a leftward position due to high or normal differential pumping pressure. This allows testing of the circuitry to insure proper operation in a non-error or non-failure normal operating mode.

The sensor circuitry is connected to the coils by disconnectable connectors such as cables 240, 242 and 244. Cable 240 connects resistor R13 to sensing coil 66. Cable 242 connects resistor R11 to reference coil 84. Cable 244 connects common node 246 between the coils to common reference or ground 208. Circuitry is provided for indicating improper field installation including non-connection of the sensor circuit to the coils, defective connection of the cables, defective cables, etc. Zener diode CR12 has its cathode connected to reference coil 84 at node 248 between resistor R11 and reference coil 84. Zener diode CR12 has its anode connected to common ground reference 208 relative to the power supply. When coils 66 and 88 are not connected to the driver and monitor sensor circuitry, the load on the secondary of transformer 202 is decreased such that the voltage thereacross rises and in turn the AC signal voltage plus $V_{AC}$ rises, and hence the half-wave rectified voltage through diode CR11 rises. Zener diode CR12 insures that the voltage across reference coil 84 will be less than the voltage across sensor coil 66 and hence cause generation of the output error signal at output pin 14 of amplifier 214, notwithstanding the increased voltage of the half-wave rectified AC signal due to the absence of the load otherwise provided by the coils.

It has been found beneficial to include diode CR16 having its anode connected to reference input pin 13 of amplifier 214 and its cathode connected to reference input pin 2 of amplifier 216, to aid in generating the output error signal when the noted cables are not connected to the coils. Diode CR16 keeps pin 2 within a diode drop, e.g. 0.7 volt, of pin 13, notwithstanding the increased AC signal voltage, which in turn insures proper operation of amplifiers 214 and 216 and the transitioning high at output pins 14 and 1.

It is recognized that various equivalents, alternatives and modifications are possible within the scope of the appended claims.

We claim:
1. In a transducer having a delta coil for generating a magnetic flux path through a path of movement of a magnetically permeable member, such that movement of said member changes the return coupled flux linkage, which flux change indicates movement of said member, and having a reference coil spaced sufficiently from said path of movement of said member such that movement of the latter has less affect on return coupled flux linkage of said reference coil than said delta coil, a sensor circuit comprising:
   means connecting said coils in respective parallel voltage dividers;
   means applying electrical potential across said parallel voltage dividers such that there is no relative phase shift between said coils;
   differential amplifier means having a reference input from said reference coil and a comparing input from said delta coil, and having an output, such that when said magnetically permeable member moves in a given direction the voltage at said comparing input of said differential amplifier means increases in a given polarity direction above a given threshold relative to the voltage at said reference input of said differential amplifier means such that said output of said differential amplifier means increases and provides an output error signal.

2. The invention according to claim 1 comprising a test contact means for completing a shorting circuit between said coils and applying the same voltage across each coil, whereby to prevent differential voltages from being developed across said coils and thus prevent said output error signal, whereby to simulate a given non-error condition of said member.

3. The invention according to claim 1 comprising operational amplifier means having a comparing input to the output of said differential amplifier means and having a reference input connected to said means applying electrical potential across said parallel voltage dividers, and having an output, such that when the voltage at said comparing input of said operational amplifier means increases in a given polarity direction above the voltage at said reference input of said operational amplifier means, said output of said operational amplifier means transitions and provides an output error signal.

4. The invention according to claim 3 comprising connection means for connecting said sensor circuit to said coils, and comprising means indicating improper field installation including non-connection of said sensor circuit to said coils and defective said connection means, comprising a zener diode having a cathode connected to said reference coil and an anode connected to a common reference relative to said power supply means to insure that the voltage across said reference coil is less than the voltage across said delta coil such that said differential amplifier means and said operational amplifier means generate said output error signal notwithstanding increased voltage of said half-wave rectified AC signal due to the absence of the load otherwise provided by said coils.

5. The invention according to claim 3 comprising peak detection amplifier means connected between said differential amplifier means and said operational amplifier means, said peak detection amplifier means having an input connected to said output of said differential amplifier means and having an output connected to said comparing input of said operational amplifier means for comparison against said voltage from said means applying electrical potential at said reference input of said operational amplifier means.

6. The invention according to claim 3 comprising second operational amplifier means having a reference input connected to said output of said first mentioned operational amplifier means for receiving said output error signal, and having a comparing input connected through an RC timing circuit to said output of said first operational amplifier means for receiving a delayed said output error signal, said second operational amplifier means having an output which transitions when the voltage at said comparing input of said second operational amplifier means increases in a given polarity direction as said output error signal from said output of said first operational amplifier means charges said RC timing circuit above a given threshold value relative to the voltage at said reference input of said second operational amplifier means provided by said output error signal from said output of said first operational amplifier means.

7. The invention according to claim 6 comprising a diode having an anode connected to said reference input of said first mentioned operational amplifier means and having a cathode connected to said reference input of said second operational amplifier means to insure that the last two mentioned reference inputs are within a given voltage drop of each other and insure transitioning of said outputs of said first and second operational amplifier means in response to said improper field installation.

8. The invention according to claim 6 comprising a diode having an anode connected to said output of said second operational amplifier means and a cathode connected to said comparing input of said second operational amplifier means to prevent oscillation at said output of said second operational amplifier means.

9. The invention according to claim 6 comprising a safety threshold circuit supplying a regulated DC signal to said reference input of said second operational amplifier means to provide a minimum threshold for said comparing input of said second operational amplifier means regardless of the condition of said output error signal from said output of said first operational amplifier means to prevent false transitioning of said output of said second operational amplifier means.

10. The invention according to claim 9 wherein said safety threshold circuit comprises a voltage divider network having a pair of series connected resistors and having a diode with an anode connected to a node between said resistors and a cathode connected to said reference input of said second operational amplifier means.

11. The invention according to claim 6 wherein said means applying electrical potential across said parallel voltage dividers comprises power supply means supplying a regulated DC signal for said amplifier means and supplying an AC signal, and comprising a diode half-wave rectifying said AC signal and supplying same to said parallel voltage dividers.

12. The invention according to claim 11 comprising a capacitor connected to the cathode of said diode for filtering out discontinuities in the half-wave rectified signal through said diode.

13. The invetion according to claim 12 comprising a second diode having an anode connected to the node between said first mentioned diode and said last mentioned capacitor and having a cathode supplied with said regulated DC signal, such that said second diode provides transient protection by shunting current back to said power supply.

14. In a transducer having a delta coil for generating a magnetic flux path through a path of movement of a magnetically permeable member, such that movement of said member changes the return coupled flux linkage, which flux change indicates movement of said member, and having a reference coil spaced sufficiently from said path of movement of said member such that movement of the latter has less affect on return coupled flux linkage of said reference coil than said delta coil, a sensor circuit comprising:

means connecting said coils in parallel;
    means applying electrical potential across said parallel coils;
    error amplifier means having a reference input from said reference coil and a comparing input from said delta coil, and having an output, such that when said magnetically permeable member moves in a given direction the voltage at said comparing input of said amplifier means increases in a given polarity direction above a given threshold relative to the voltage at said reference input of said amplifier means such that said output of said amplifier means increases and provides an output error signal;

timing means connected to said output of said amplifier means and delaying said output error signal; and switch means connected to said timing means and actuated by said delayed output error signal to provide a designated switching function.

15. The invention according to claim 14 comprising test contact means for completing a shorting circuit between said coils and applying the same voltage across each coil, whereby to prevent differential voltages from being developed across said coils and thus prevent said output error signal, whereby to simulate a given nonerror condition of said member.

16. The invention according to claim 14 wherein said coils are connected in respective parallel voltage dividers.

17. The invention according to claim 14 comprising a safety threshold circuit supplying a regulated DC signal to said reference input of said output amplifier means to provide a minimum threshold for said comparing input of said output amplifier means regardless of the condition of said output error signal from said output of said error amplifier means to prevent false actuation of said switch means.

18. The invention according to claim 17 wherein said safety threshold circuit comprises a voltage divider network having a pair of series connected resistors and having a diode with an anode connected to a node between said resistors and a cathode connected to said reference input of said output amplifier means.

19. The invention according to claim 14 comprising output amplifier means having a reference input connected to said output of said error amplifier means for receiving said output error signal, and having a comparing input connected through an RC timing circuit to said output of said error amplifier means, said timing means comprising said RC timing circuit such that said comparing input of said output amplifier means receives the delayed said output error signal, said output amplifier means having an output connected to said switch means, such that said output of said output amplifier means transitions and actuates said switch means when the voltage at said comparing input of said output amplifier means increases in a given polarity direction as said output error signal from said output of said error amplifier means charges said RC timing circuit above a given threshold value relative to the voltage at said reference input of said error amplifier means provided by said output error signal from said output of said error amplifier means.

20. The invention according to claim 19 wherein said output amplifier means comprises an operational amplifier having a comparing input, a reference input and an output, said error amplifier means comprises a differential amplifier having a reference input from said reference coil and a comparing input from said delta coil, and having an output, said error amplifier means further comprising a peak detector amplifier connected to said output of said differential amplifier, said error amplifier means further comprising a differential amplifier having a reference input from said means applying electrical potential across said coils, having a comparing input from said peak detector amplifier, and having an output connected to said reference input of said differential amplifier of said output amplifier means, said output of said differential amplifier of said error amplifier means also connected to said RC timing circuit.

21. The invention according to claim 19 wherein said switch means includes a latching relay having a set coil actuated by said output of said output amplifier means and having a reset coil connected to said RC timing circuit, wherein said RC timing circuit includes a capacitor charged by said output error signal from said output of said error amplifier means to said given threshold relative to the voltage at said reference input of said output amplifier means provided by said output error signal from said output of said error amplifier means, and comprising reset switch means user actuated to complete a circuit from said capacitor through said reset coil to discharge said capacitor through said reset coil and reset said relay.

22. The invention according to claim 19 comprising a diode having an anode connected to said output of said output amplifier means and a cathode connected to said comparing input of said output amplifier means to prevent oscillation at said output of said output amplifier means.

23. The invention according to claim 21 wherein said means applying electrical potential across said parallel coils comprises power supply means supplying a regulated DC signal for said amplifier means and supplying an AC signal, and comprising a diode half-wave rectifying said AC signal and supplying same to said parallel coils.

24. The invention according to claim 23 comprising a second diode having an anode connected to a node between said capacitor and said reset coil and having a cathode supplied with said regulated DC signal to shunt transient surge current back to said power supply and prevent false resetting of said latching relay.

25. The invention according to claim 23 comprising a second capacitor connected to the cathode of said diode for filtering out discontinuities in the half-wave rectified signal through said diode.

26. The invention according to claim 25 comprising a second diode having an anode connected to the node between said first mentioned diode and said second capacitor and having a cathode supplied with said regulated DC signal, such that said second diode provides transient protection by shunting current back to said power supply.

27. In a transducer having a delta coil for generating a magnetic flux through a path of movement of a magnetically permeable member, such that movement of said member changes the return coupled flux linkage, which flux change indicates movement of said member, and having a reference coil spaced sufficiently from said path of movement of said member such that movement of the latter has less affect on return coupled flux linkage of said reference coil than said delta coil, a sensor circuit comprising:

power supply means supplying a regulated DC signal and supplying an AC signal;

means connecting said coils in respective parallel voltage dividers;

diode means half-wave rectifying said AC signal and supplying same to said parallel voltage dividers with no phase shift between said coils;

differential amplifier means having a reference input from said reference coil and a comparing input from said delta coil, and having an output, such that when said magnetically permeable member moves in a given direction the voltage at said comparing input of said differential amplifier means increases in a given polarity direction above a given threshold relative to the voltage at said reference input of said differential amplifier means such that said output of said differential amplifier means provides an output signal;

first operational amplifier means having a reference input connected to said diode means and supplied with said half-wave rectified AC signal, and having a comparing input connected to said output of said differential amplifier means, and having an output, such that when the voltage at said input of said first operational amplifier means from said output of said differential amplifier means increases in a given polarity direction above a given threshold value relative to the half-wave rectified AC signal voltage at said reference input of said first operational amplifier means, the output of said first operational amplifier means transitions and provides an output error signal, said half-wave rectified AC signal voltage from said diode means providing a dynamic floating reference at said reference input of said first operational amplifier means;

timing means comprising an RC timing circuit having a resistor and capacitor connected to said output of said first operational amplifier means and delaying said output error signal;

second operational amplifier means having a reference input connected to said output of said first operational amplifier means, and having a comparing input connected by said RC timing circuit to said output of said first operational amplifier means, and having an output, such that said output of said second operational amplifier means transitions when the voltage at said comparing input of said second operational amplifier means increases in a given polarity direction as said output error signal from said output of said first operational amplifier means charges said capacitor of said RC timing circuit above a given threshold value relative to the voltage at said reference input of said second operational amplifier means provided by said output error signal from said output of said first operational amplifier means;

switch means connected to said output of said second operational amplifier means and actuated thereby to provide a designated switching function.

28. The invention according to claim 27 comprising further operational amplifier means connected between said differential amplifier means and said first operational amplifier means and providing a peak detector.

29. The invention according to claim 28 wherein said further operational amplifier means has a comparing input connected to said output of said differential amplifier means, has an output connected through a diode to said comparing input of said first operational amplifier means, said further operational amplifier means having a reference input connected to said output of said further operational amplifier means through said diode.

30. The invention according to claim 27 comprising connection means for connecting said sensor circuit to said coils, and comprising means indicating improper field installation including non-connection of said sensor circuit to said coils and defective said connection means, comprising a zener diode having a cathode connected to said reference coil and an anode connected to a common reference relative to said power supply means to insure that the voltage across said reference coil is less than the voltage across said delta coil such that said differential amplifier means and said first operational amplifier means generate said output error signal notwithstanding increased voltage of said half-wave rectified AC signal due to the absence of the load otherwise provided by said coils.

31. The invention according to claim 30 comprising a diode having an anode connected to said reference input of said first operational amplifier means and having a cathode connected to said reference input of said second operational amplifier means to insure that said last two mentioned reference inputs are within a given voltage drop of each other and insure transitioning of said outputs of said first and second operational amplifier means in response to said improper field installation.

32. The invention according to claim 27 wherein said switch means includes a second charging capacitor charged by said regulated DC signal, a latching relay having a set coil connected to said second capacitor, a semiconductor switch having a pair of main terminals connected in series with said set coil, said semiconductor switch having a control terminal connected to said output of said second operational amplifier means such that said transitioning of the latter drives said semiconductor switch into conduction to complete a current path therethrough and discharge said second capacitor through said set coil to actuate said relay to a first condition, and wherein said relay has a reset coil connected to said first mentioned capacitor, and comprising a second semiconductor switch having a pair of main terminals connected in series with said reset coil and having a control terminal controlled by a manual user-operated reset switch connected in a reset circuit with said regulated DC signal for biasing said second semiconductor switch into conduction to complete a current path between said main terminals of said second semiconductor switch and discharge said first capacitor through said reset coil to resettingly actuate said relay to an alternate condition.

33. The invention according to claim 32 wherein said reset circuit comprises a third capacitor charged by said regulated DC signal and connected to said manual reset switch and discharged thereby upon user actuation of said reset switch, a third semiconductor switch having a pair of main terminals connected in series between said regulated DC signal supply and a fourth capacitor and having a control terminal connected to said third capacitor, said third semiconductor switch being biased into conduction by discharge of said third capacitor to complete a current path through said main terminals of said third semiconductor switch to charge said fourth capacitor, said fourth capacitor being connected to said control terminal of said second semiconductor switch to bias the latter into conduction.

34. The invention according to claim 32 comprising a safety threshold circuit supplying said regulated DC signal to said reference input of said second operational amplifier means to provide a minimum threshold for said comparing input of said second operational amplifier means regardless of the condition of said output error signal from said output of said first operational amplifier means to prevent false actuation of said relay, and comprising a second diode having an anode connected to a node between said first mentioned capacitor and said reset coil and having a cathode supplied with said regulated DC signal to shunt transient surge current back to said power supply and prevent false resetting of said latching relay.

35. The invention according to claim 32 comprising a second diode having a cathode supplied with said regulated DC signal and having an anode connected to said second capacitor to provide a low impedance path from said second capacitor to said power supply means to prevent false tripping of said set coil of said relay.

36. Oil pressure sensor circuitry for an oil pressure sensor directly mounted to a lubrication pump and directly inserted into and across the high and low pressure sides of said pump to sense differential pump pressure, said sensor comprising a sensor body having a first portion disposed internally within said pump to be exposed to the internal pump environment, and a second portion extending externally of said pump, a magnetically permeable piston axially slideable within said first internal sensor body portion, a low pressure port in said first internal sensor body portion communicating with said low pressure side of said pump to apply pressure from the latter to one axial end of said piston, a high pressure port in said first internal sensor body portion communicating with said high pressure side of said pump to apply pressure from the latter to the other axial end of said piston, a delta coil mounted in said body for generating a magnetic flux path including portions extending into the path of movement of said piston such that said piston movement changes the return coupled flux linkage, which flux change indicates piston movement according to said pressure differential, a reference coil mounted in said body adjacent said delta coil and on the opposite side thereof from said piston such that movement of said piston has less affect on returned coupled flux linkage of said reference coil than said delta coil, said lubrication pump having a pump motor, said sensor circuitry comprising:

power supply means supplying a regulated DC signal and supplying an AC signal;
means connecting said coils in respective parallel voltage dividers;
diode means half-wave rectifying said AC signal and supplying same to said parallel voltage dividers;
differential amplifier means having a reference input from said reference coil and a comparing input from said delta coil, and having an output, such that when said piston moves in a given direction the voltage at said comparing input of said differential amplifier means increases in a given polarity direction above a given threshold relative to the voltage at said reference input of said differential amplifier means such that said output of said differential amplifier means orovides an output signal;
first operational amplifier means having a reference input connected to said diode means and supplied with said half-wave rectified AC signal, and having a comparing input connected to said output of said differential amplifier means, and having an output, such that when the voltage at said comparing of said first operational amplifier means from said output of said differential amplifier means increases in a given polarity direction above a given threshold value relative to the half-wave rectified AC signal voltage at said reference input of said first operational amplifier means, the output of said first operational amplifier means transitions and provides an output error signal, said half-wave rectified AC signal voltage from said diode means providing a dynamic floating reference at said reference input of said first operational amplifier means;
timing means comprising an RC timing circuit having a resistor and capacitor connected to output of said first operational amplifier means and delaying said output error signal;
second operational amplifier means having a reference input connected to said output of said first operational amplifier means, and having a comparing input connected by said RC timing circuit to said output of said first operational amplifier means, and having an output, such that said output of said second operational amplifier means transitions when the voltage at said comparing input of said second operational amplifier means increases in a given polarity direction as said output error signal from said output of said first operational amplifier means charges said capacitor of said RC timing circuit above a given threshold value relative to the voltage at said reference input of said second operational amplifier means provided by said output error signal from said output of said first operational amplifier means;
switch means connected to said output of said second operational amplifier means and actuated thereby to turn off said pump motor, said switch means including a second charging capacitor charged by said regulated DC signal, a latching relay having a set coil connected to said second capacitor, a semiconductor switch having a pair of main terminals connected in series with said set coil, said semiconductor switch having a control terminal connected to said output of said second operational amplifier means such that said transitioning of the latter drives said semiconductor switch into conduction to complete a current path therethrough and discharge said second capacitor through said set coil to actuate said relay to a first condition, and wherein said relay has a reset coil connected to said first mentioned capacitor, and comprising a second semiconductor switch having a pair of main terminals connected in series with said reset coil and having a control terminal controlled by a manual user-operated reset switch connected in a reset circuit with said regulated DC signal for biasing said second semiconductor switch into conduction to complete a current path between said main terminals of said second semiconductor switch and discharge said first capacitor through said reset coil to resettingly actuate said relay to an alternate condition;
a safety threshold circuit supplying said regulated DC signal to said reference input of said second operational amplifier means to provide a minimum threshold for said comparing input of said second operational amplifier means regardless of the condition of said output error signal from said output of said first operational amplifier means to prevent false actuation of said relay.

37. The invention according to claim 36 comprising:
a second diode having an anode connected to a node between said capacitor and said reset coil and having a cathode supplied with said regulated DC signal to shunt transient surge current back to said power supply and prevent false resetting of said relay;
connection means for connecting said sensor circuit to said coils, and comprising means indicating improper field installation including non-connection of said sensor circuit to said coils and defective said connection means, comprising a zener diode having a cathode connected to said reference coil and an anode connected to a common reference relative to said power supply means to insure that the voltage across said reference coil is less than the voltage across said delta coil such that said differential amplifier means and said first operational amplifier means generate said output error signal notwithstanding increased voltage of said half-wave rectified AC signal due to the absence of the load otherwise provided by said coils;

test contact means for completing a shorting circuit between said coils and applying the same voltage across each coil, whereby to prevent differential voltages from being developed across said coils and thus prevent said output error signal, whereby to simulate a given non-error condition of said pump.

* * * * *